(12) United States Patent
Baldauf et al.

(10) Patent No.: US 11,666,003 B2
(45) Date of Patent: Jun. 6, 2023

(54) QUICK-RELEASE LOCK FOR BALER KNOTTER HEAD

(71) Applicant: AGCO Corporation, Duluth, GA (US)

(72) Inventors: Jeffery A. Baldauf, Hesston, KS (US); David A. Becker, Newton, KS (US); Patrick Kendrick, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 164 days.

(21) Appl. No.: 17/417,108

(22) PCT Filed: Nov. 5, 2019

(86) PCT No.: PCT/IB2019/059485
§ 371 (c)(1),
(2) Date: Jun. 21, 2021

(87) PCT Pub. No.: WO2020/128663
PCT Pub. Date: Jun. 25, 2020

(65) Prior Publication Data
US 2022/0071099 A1    Mar. 10, 2022

Related U.S. Application Data

(60) Provisional application No. 62/783,897, filed on Dec. 21, 2018.

(51) Int. Cl.
*A01F 15/14*        (2006.01)

(52) U.S. Cl.
CPC ................... *A01F 15/145* (2013.01)

(58) Field of Classification Search
CPC .............................. A01F 15/14; A01F 15/145
(Continued)

(56) References Cited

U.S. PATENT DOCUMENTS

| | | | |
|---|---|---|---|
| 2,670,978 A | * | 3/1954 | Rudeen ................ A01F 15/145 289/10 |
| 6,705,214 B1 | | 3/2004 | Stamps |

(Continued)

FOREIGN PATENT DOCUMENTS

| | | |
|---|---|---|
| EP | 2 025 219 A1 | 2/2009 |
| EP | 2 260 693 A1 | 12/2010 |
| WO | 2018/202594 A1 | 11/2018 |

OTHER PUBLICATIONS

UK Intellectual Property Office, Search Report for related UK Application No. GB1900147.8, dated Jun. 26, 2019.

(Continued)

*Primary Examiner* — Jimmy T Nguyen

(57) ABSTRACT

A bale binding mechanism is configured to secure a strand of binding material around a bale of severed crop material. The bale binding mechanism includes a chassis, a knotter head assembly, and a captive lock. The knotter head assembly is operable to form at least one knot in the strand of binding material. The knotter head assembly includes a knotter head frame swingably mounted relative to the chassis and rotatable into and out of an operating position where the knotter head assembly can form the at least one knot. The captive lock is shiftably supported by one of the chassis and the knotter head frame. The captive lock is removably engaged with the other one of the chassis and the knotter head frame to secure the knotter head assembly in the operating position, with the captive lock being releasable to permit rotation of the knotter head assembly out of the operating position.

18 Claims, 10 Drawing Sheets

(58) Field of Classification Search
USPC .......................... 100/33 R; 289/2, 10, 11, 14
See application file for complete search history.

(56) References Cited

U.S. PATENT DOCUMENTS

| | | |
|---|---|---|
| 9,226,453 B2 * | 1/2016 | Schoonheere ........ A01F 15/145 |
| 2014/0103647 A1 | 4/2014 | Schoonheere et al. |
| 2015/0272011 A1 * | 10/2015 | Demon .................. B65H 69/04 |
| | | 100/33 R |
| 2018/0125012 A1 | 5/2018 | Naeyaert |
| 2019/0053436 A1 | 2/2019 | Figger et al. |

OTHER PUBLICATIONS

European Patent Office, International Search Report for related International Application No. PCT/IB2019/059485, dated Jan. 16, 2020.

* cited by examiner

QUICK-RELEASE LOCK FOR BALER KNOTTER HEAD

BACKGROUND

1. Field

The present invention relates generally to agricultural baling equipment. More specifically, embodiments of the present invention concern a bale binding mechanism with a knotter head assembly having a captive lock.

2. Discussion of Prior Art

Powered agricultural balers have long been used to bind severed hay material and other severed crop material into bales for later use, such as feeding of livestock. Balers that use discrete lengths of twine (or other strands of binding material) to bind loose material into a bale often include a knotter mechanism to mechanically form a knot in the strand of binding material. Such knotter mechanisms are known to involve complex mechanical assemblies that can be prone to wear and can require frequent maintenance.

Conventional knotter mechanisms can be shifted into and out of an operating position and into an access position to facilitate knotter maintenance and provide access for replacement of knotter components. However, prior art knotter mechanisms are time consuming to repair and maintain. To the extent that such knotter mechanisms can be shifted from the operating position to an access position for maintenance or repair, the structural components permitting such movement generally comprise small components that are difficult to manipulate and can be easily lost by the user.

SUMMARY

The following brief summary is provided to indicate the nature of the subject matter disclosed herein. While certain aspects of the present invention are described below, the summary is not intended to limit the scope of the present invention.

Embodiments of the present invention provide a bale binding mechanism that does not suffer from the problems and limitations of the prior art baling equipment set forth above.

A first aspect of the present invention concerns a bale binding mechanism configured to secure a strand of binding material around a bale of severed crop material. The bale binding mechanism broadly includes a chassis, a knotter head assembly, and a captive lock. The knotter head assembly is operable to form at least one knot in the strand of binding material. The knotter head assembly includes a knotter head frame swingably mounted relative to the chassis and rotatable into and out of an operating position where the knotter head assembly can form the at least one knot. The captive lock is shiftably supported by one of the chassis and the knotter head frame. The captive lock is removably engaged with the other one of the chassis and the knotter head frame to secure the knotter head assembly in the operating position, with the captive lock being releasable to permit rotation of the knotter head assembly out of the operating position.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein.

Figure 1:
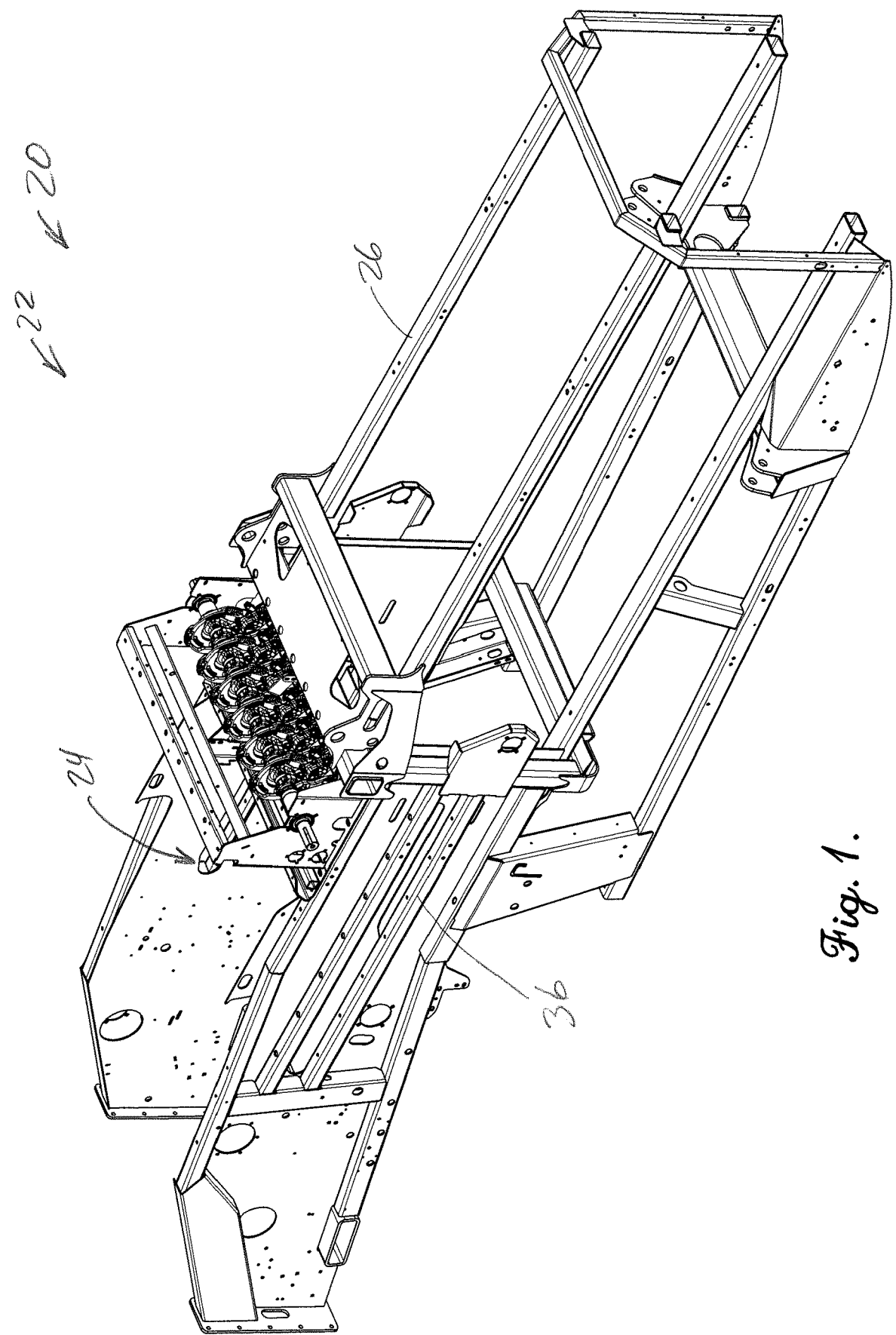
FIG. 1 is a fragmentary perspective of an agricultural baler constructed in accordance with a preferred embodiment of the present invention, with the baler including a bale binding mechanism with a baler chassis, a knotter shaft, knotter head assemblies, knotter gears, and captive locks.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Figure 2:
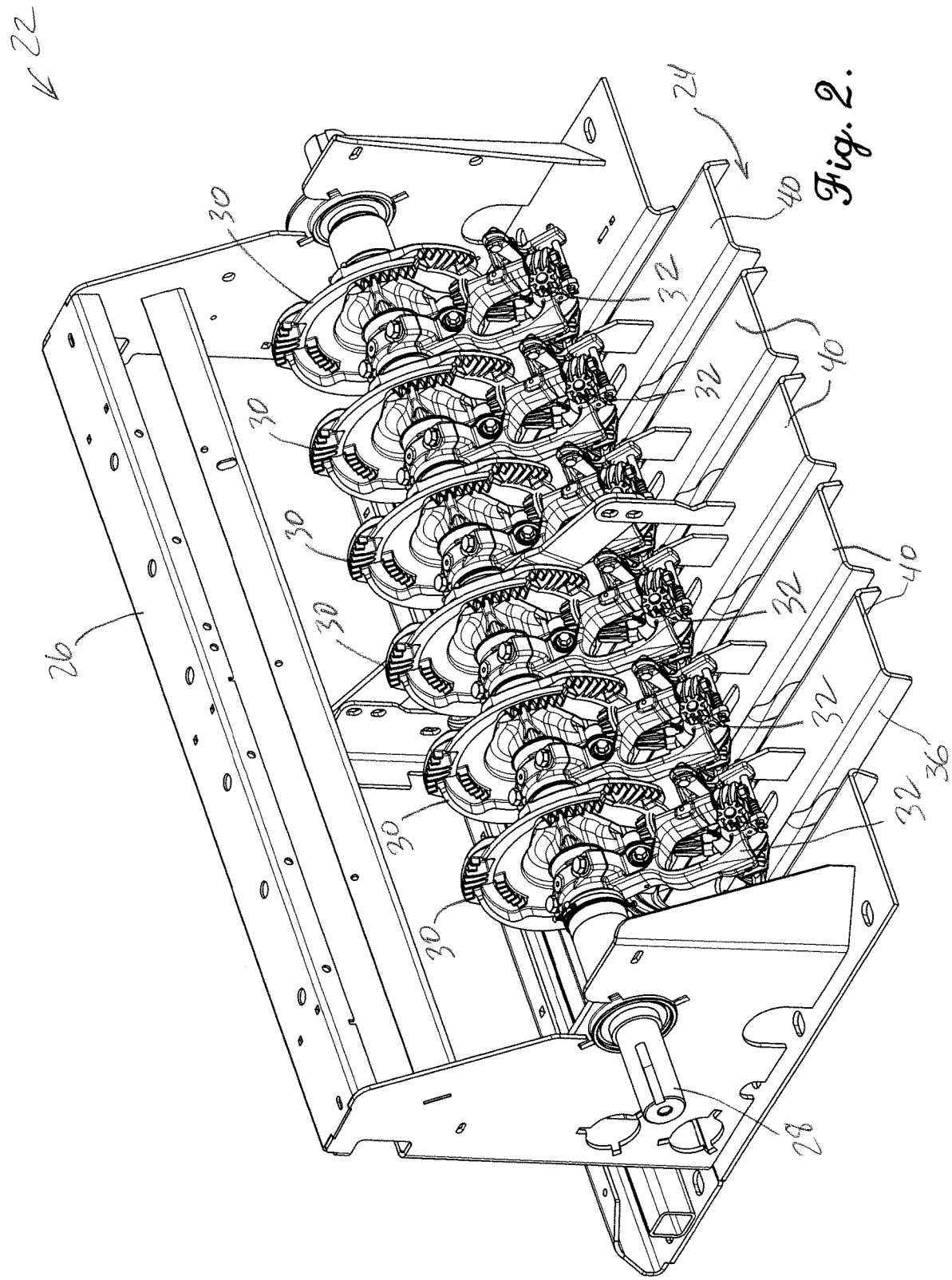
FIG. 2 is a fragmentary perspective of the agricultural baler similar to FIG. 1, but enlarged to depict the knotter gears and knotter head assemblies of the bale binding mechanism operably supported on the knotter shaft.
Figure 3:
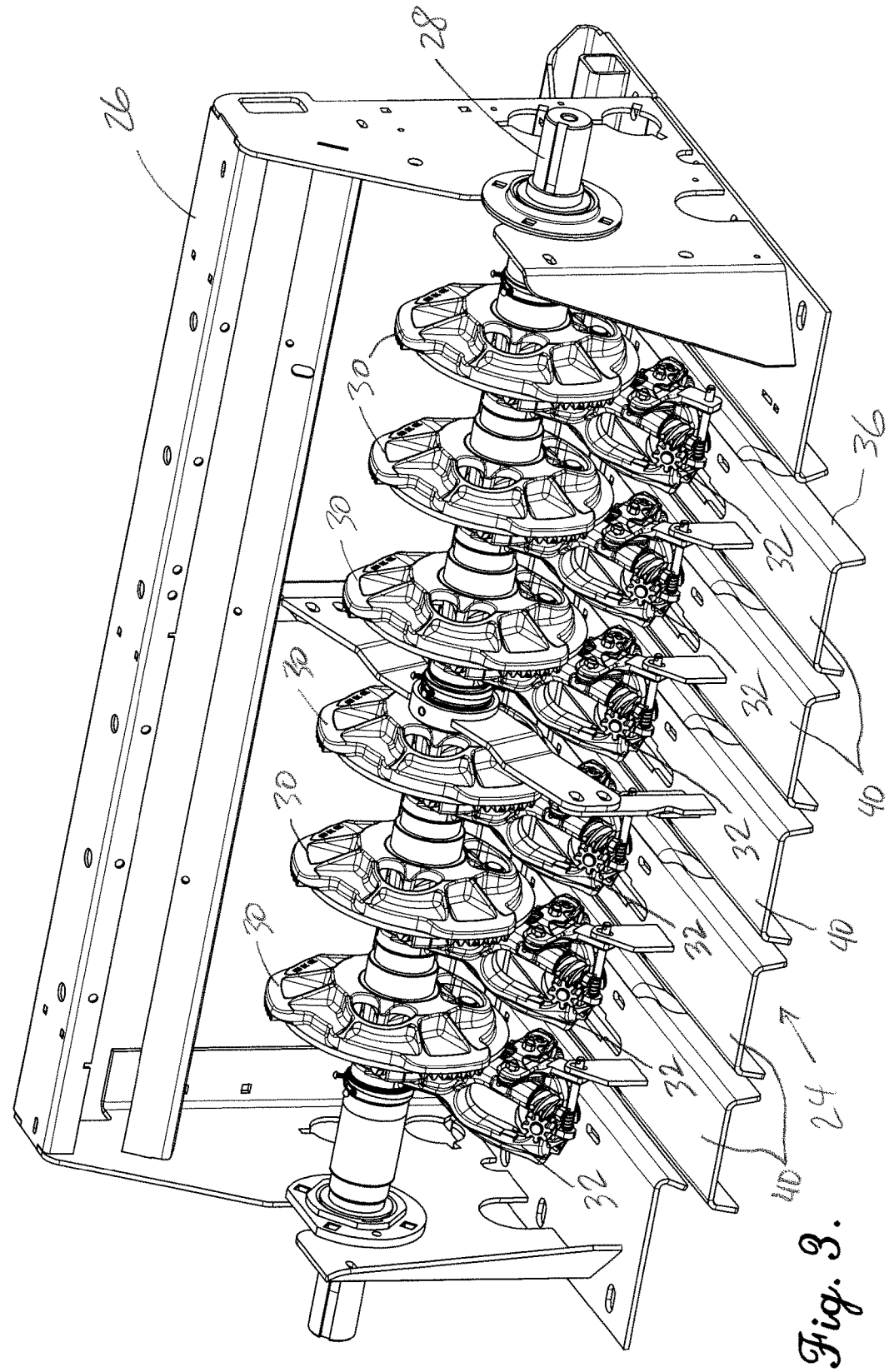
FIG. 3 is a fragmentary perspective of the agricultural baler similar to FIG. 2, but taken from the opposite side of the baler.

Turning to FIGS. 1-3, an agricultural baler 20 is configured to collect severed crop material (not shown) from a field and form a series of bales (not shown) from the severed crop material. The baler 20 preferably provides a bale binding mechanism 22 configured to secure strands of binding material (not shown) around a bale of severed crop material.

Preferably, the bale binding mechanism 22 is provided as part of the baler 20, which can be advanced along a field to collect severed crop material. In the usual manner, the baler 20 is generally towed by a powered tractor (not shown), or other self-powered vehicle, so as to be advanced along a windrow of severed crop material. As the baler 20 is advanced, a pickup mechanism (not shown) of the baler 20 collects the windrow and directs the windrow material into a baling chamber 24.

Figure 4:
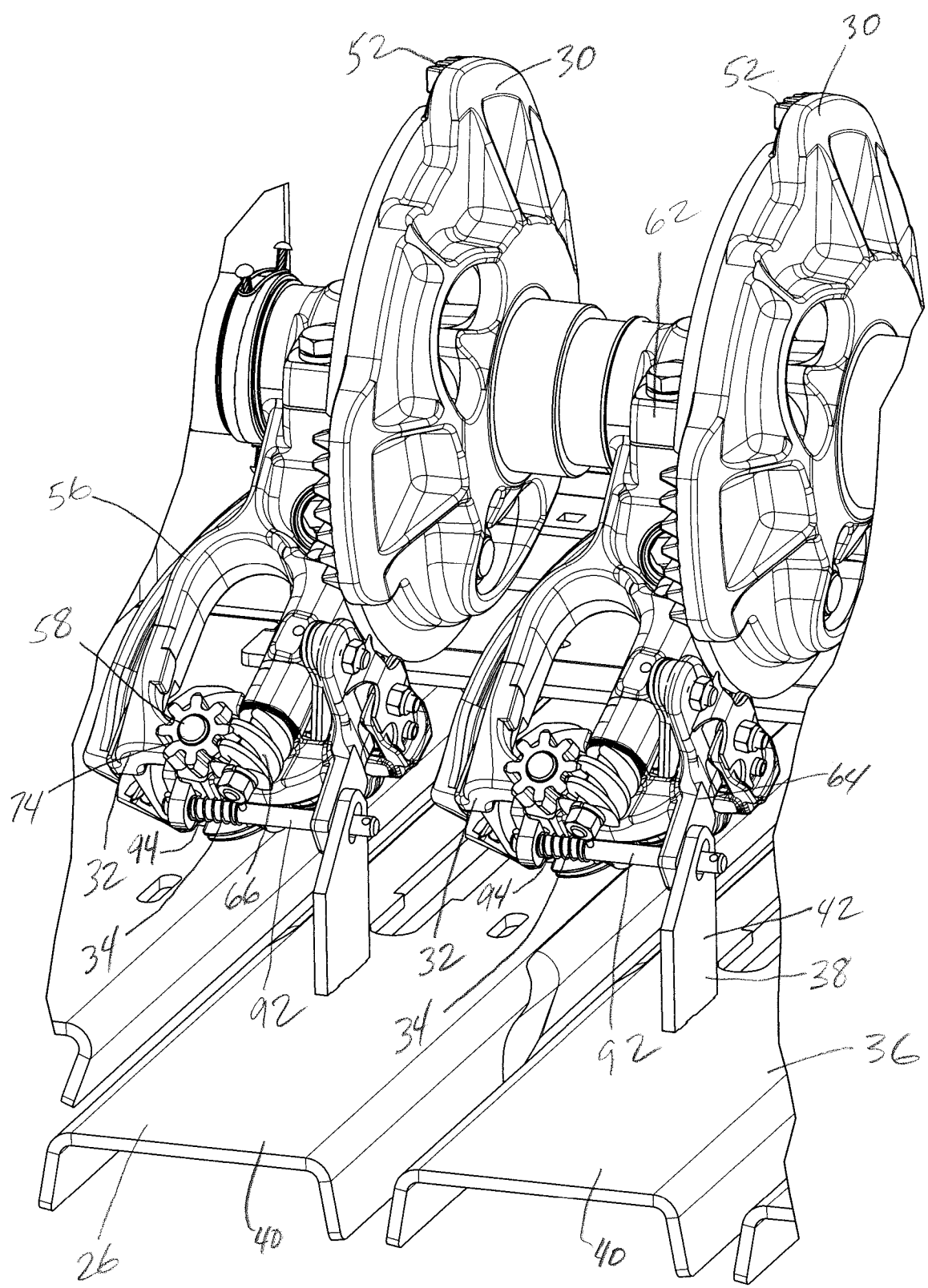
FIG. 4 is a fragmentary perspective of the agricultural baler similar to FIG. 3, but enlarged to show a pair of knotter head assemblies and knotter gears secured to the baler chassis in an operating position, with a pair of captive locks each being associated with and securing the respective knotter head assembly.

The bale binding mechanism 22 preferably includes a baler chassis 26, powered knotter shaft 28, knotter gears 30, knotter head assemblies 32, and lock mechanisms 34 (see FIGS. 2-4).

The baler chassis 26 is configured to support the baler pickup mechanism (not shown) and other operating components. The baler chassis 26 includes, among other things, a baler frame 36 that presents the baling chamber 24 and locking structures 38 to be engaged by the lock mechanisms 34.

The baler frame 36 is preferably conventional and includes, among other things, a series of fore-and-aft extending frame members 40 that at least partly define the baling chamber 24 and direct severed crop material through the baling chamber 24 as the material is formed into bales (not shown). In the illustrated embodiment, the baler frame 36 also operably supports the knotter shaft 28.

For each bale (not shown) formed by the baler 20, the baler frame 36 receives the bale in the baling chamber 24 as the strand of binding material is secured around the bale.

Figure 4A:
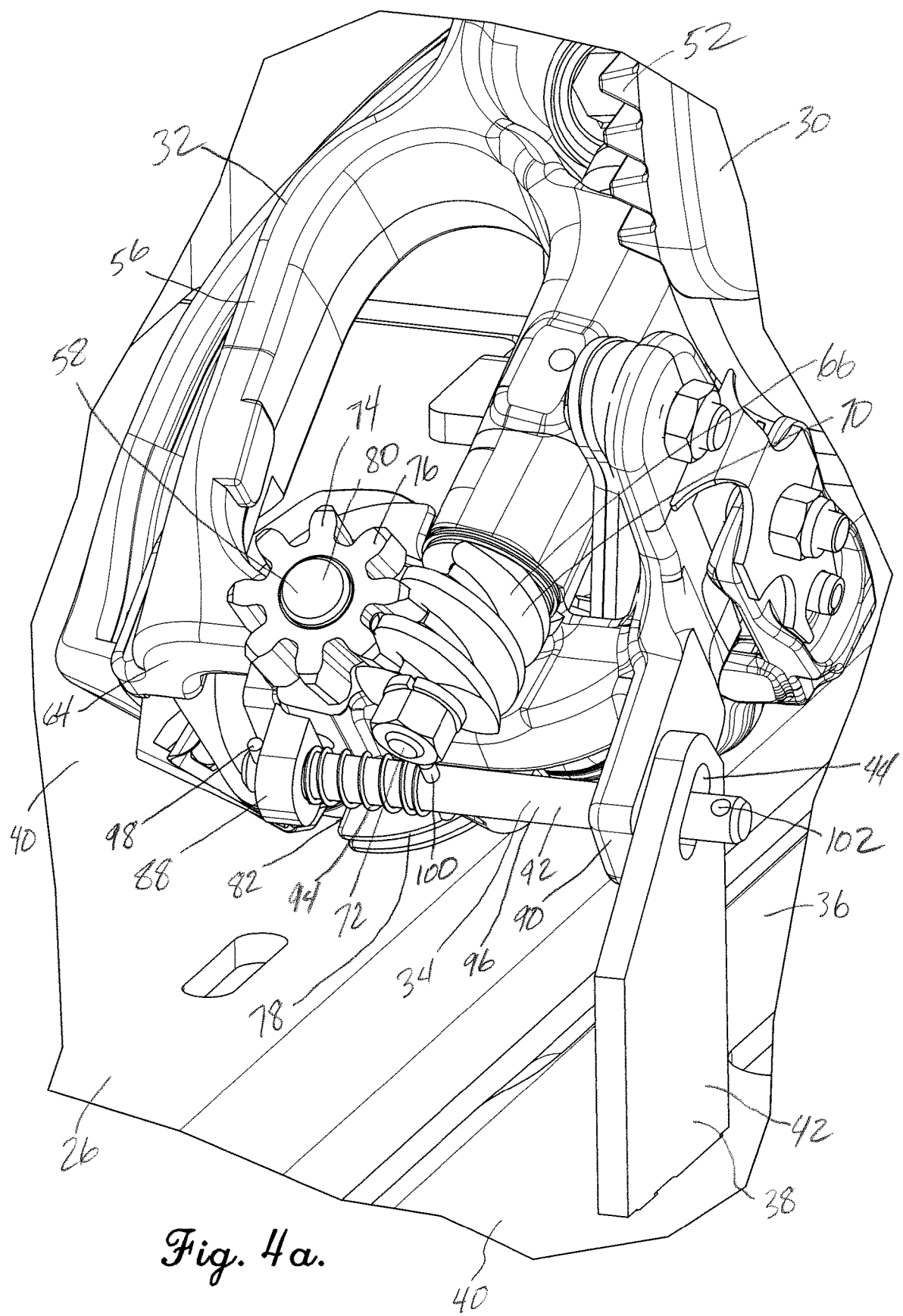
FIG. 4a is an enlarged fragmentary perspective of the agricultural baler shown in FIG. 4, showing one of the captive locks in a locked position.
Figure 5:
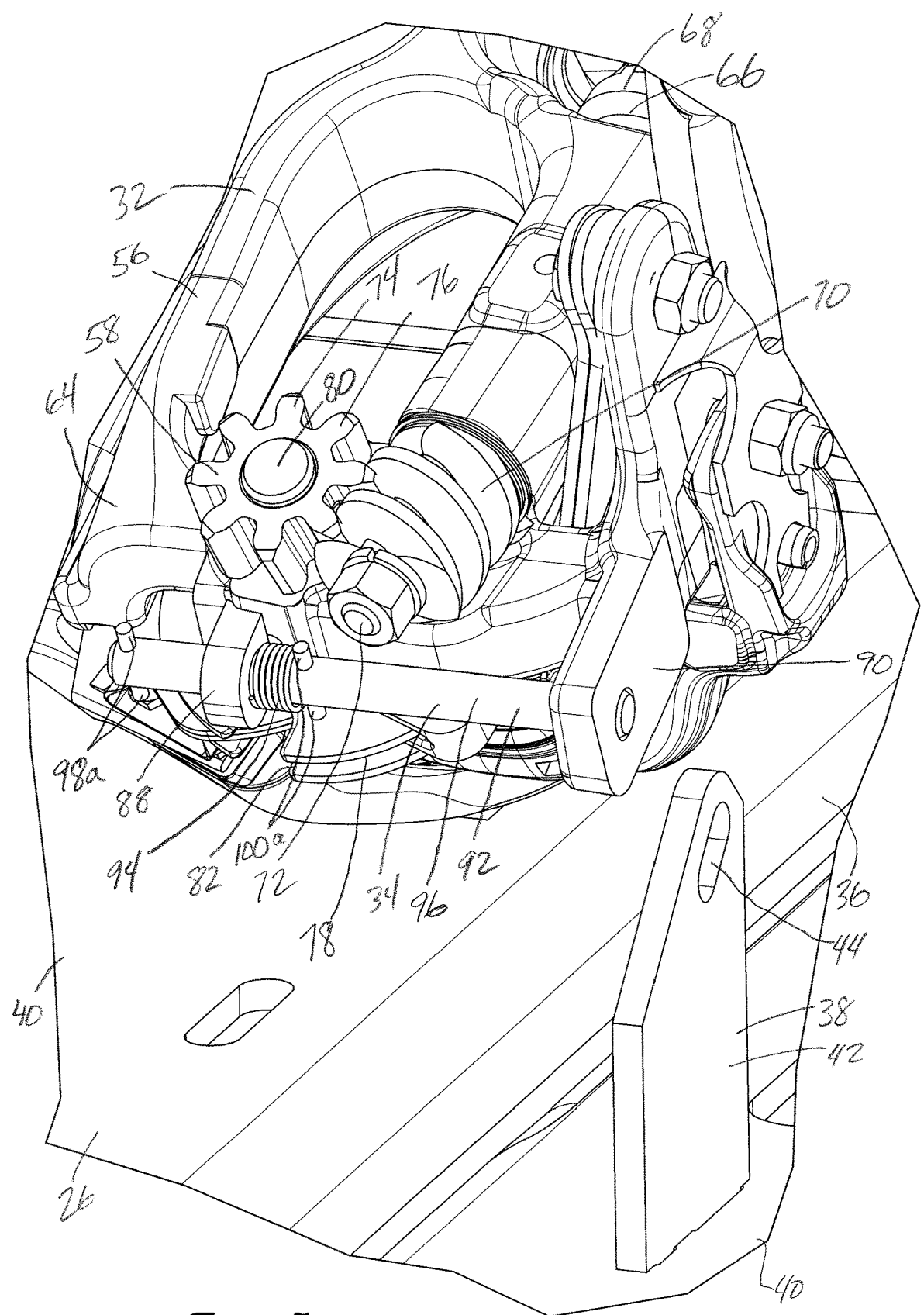
FIG. 5 is a fragmentary perspective of the agricultural baler similar to FIG. 4a, but showing the captive lock shifted out of the locked position and the knotter head assembly swung upwardly out of the operating position.

The locking structure 38 preferably comprises a plate 42 fixed to an upper one of the frame members 40. The plate 42 presents an opening 44 to slidably receive a locking pin of the lock mechanism 34 (see FIGS. 4*a* and 5).

Turning to FIGS. 2-44 and 6-8, the powered knotter shaft 28 is configured to drive the knotter gears 30 and thereby power the knotter head assemblies 32 for binding bales in the baling chamber 24. The knotter shaft 28 presents a generally cylindrical shaft surface 46 and includes a key 48 (see FIGS. 7 and 8). The illustrated knotter shaft 28 is operably supported by the baler chassis 26 for rotation about the shaft axis. Preferably, the knotter shaft 28 is positioned above the baler chassis 26 to extend laterally relative to the forward direction of the baler 20. The knotter shaft 28 is preferably drivingly coupled to a motive power source (not shown) so that the knotter shaft 28 can be selectively driven by a user. As described below, the knotter shaft 28 rotatably supports the knotter head assembly 32.

As is customary, the knotter gears 30 are configured to engage and drive corresponding ones of the knotter head assemblies 32. The illustrated knotter gear 30 has a generally unitary construction and includes inner and outer gear racks 50,52 (see FIGS. 7 and 8). The knotter gear 30 also presents a central opening 54 that slidably receives the knotter shaft 28 (see FIGS. 7 and 8). The opening 54 preferably receives the key 48 so that the knotter gear 30 is drivingly mounted on the knotter shaft 28. The knotter gear 30 is rotatable with the knotter shaft 28 and relative to the knotter head assembly 32.

In the usual manner, each knotter head assembly 32 is configured to form at least one knot in the respective strand of binding material. The knotter head assemblies 32 are preferably configured to be swingably mounted relative to the chassis 26 and rotatable into and out of an operating position where each knotter head assembly 32 can form the at least one knot (see FIG. 4). Also, as will be explained below, the knotter head assembly 32 is configured to be removably secured by the lock mechanism 34 in the operating position.

Preferably, each knotter head assembly 32 broadly includes, among other things, a knotter head frame 56, a twine disc mechanism 58, and a bill hook mechanism 60 (see FIGS. 5-8).

The knotter head frame 56 preferably carries the twine disc mechanism 58 and the bill hook mechanism 60 for driving engagement with the knotter gear 30. As will be described further, the knotter head frame 56 is cooperatively supported by the knotter shaft 28 and the baler chassis 26.

Figure 7:
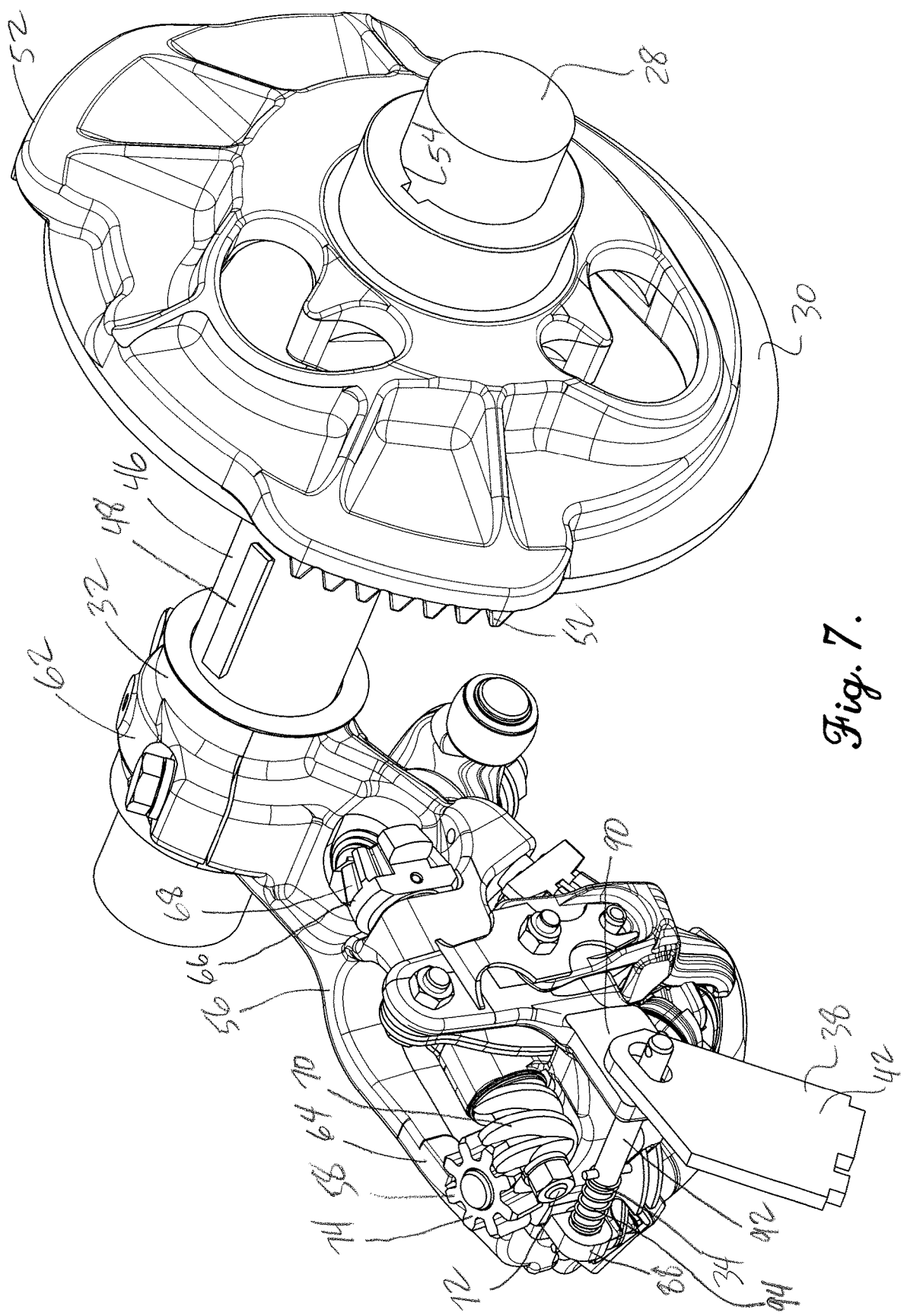
FIG. 7 is a fragmentary perspective of the agricultural baler, depicting one of the knotter gears shifted axially along the knotter shaft to depict the knotter shaft surface and the knotter shaft key.
Figure 8:
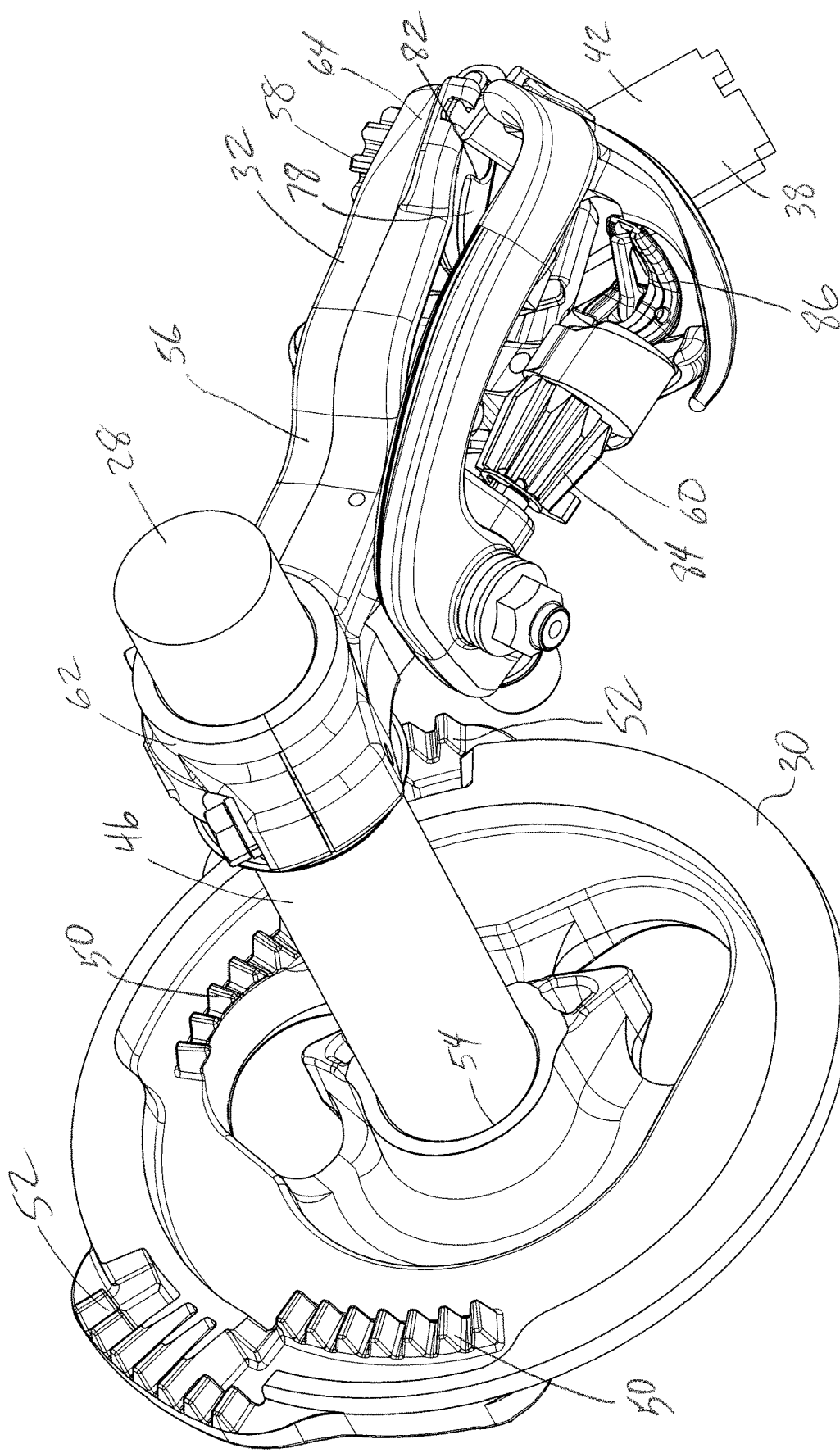
FIG. 8 is a fragmentary perspective of the agricultural baler similar to FIG. 7, but taken from the opposite side.

The illustrated knotter head frame 56 is elongated and includes an inboard sleeve 62 mounted on the knotter shaft 28 and an outboard support structure 64 (see FIGS. 7 and 8). The support structure 64 operably supports the lock mechanism 34, as explained in detail below.

The twine disc mechanism 58 of the illustrated embodiment includes a drive assembly 66 that transmits power from the knotter gear 30. The drive assembly 66 preferably includes a drive gear 68 that intermeshes with the inner gear racks 50, a worm gear 70, and a shaft 72 that drivingly connects the gears 68,70 to each other (see FIGS. 5 and 7). The drive assembly 66 is rotatably supported by the knotter head frame 56 so as to spin about the axis of the shaft 72. The drive assembly 66 rotates as one of the inner gear racks 50 engages the drive gear 68 and the knotter gear 30 is rotated. Again, rotation of the knotter shaft 28 causes rotation of the knotter gear 30.

Figure 4B:
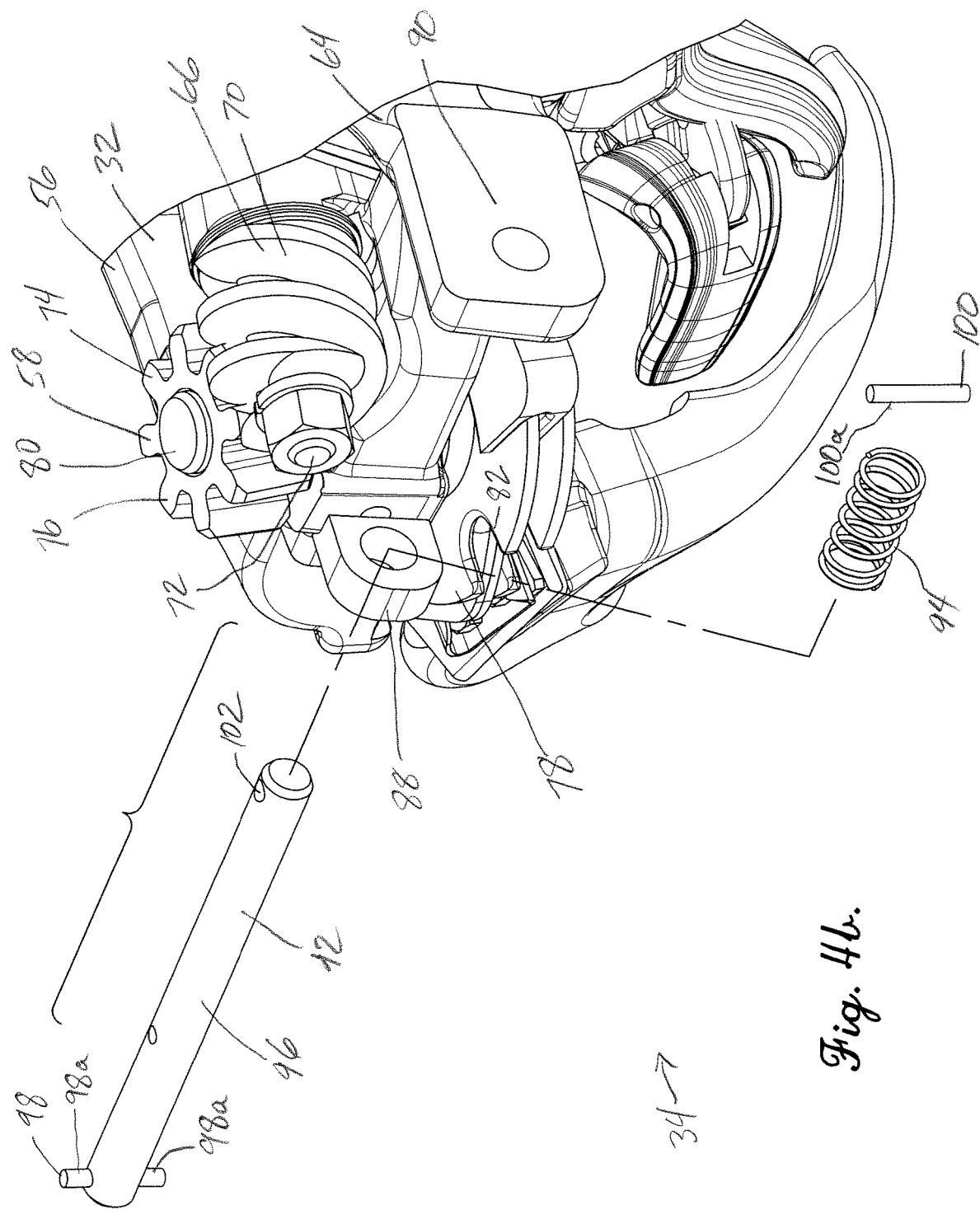
FIG. 4b is a fragmentary perspective of the agricultural baler similar to FIG. 4a, but showing the captive lock exploded from the knotter head frame of the knotter head assembly.

The twine disc mechanism 58 also includes a driven assembly 74 rotatably supported by the knotter head frame 56. The driven assembly 74 includes a driven gear 76 that intermeshes with the worm gear 70, a twine disc 78, and a shaft 80 that drivingly connects the driven gear 76 and twine disc 78 to each other (see FIGS. 4-6). The twine disc 78 presents peripheral notches 82 (see FIGS. 4*b* and 5) to engage the strand of binding material.

The driven assembly 74 is rotatably supported by the knotter head frame 56 so as to spin about the axis of the shaft 80. Because the driven gear 76 and the worm gear 70 are intermeshed, the driven assembly 74 rotates as the drive assembly 66 is rotated. As noted above, the drive assembly 66 rotates as one of the inner gear racks 50 engages the drive gear 68 and the knotter gear 30 is rotated.

The depicted bill hook mechanism 60 is rotatably supported by the knotter head frame 56. The bill hook mechanism 60 preferably includes a drive gear 84 that intermeshes with the outer gear racks 52. The bill hook mechanism 60 further includes a bill hook 86 drivingly attached to the drive gear 84 (see FIGS. 6 and 8).

The bill hook mechanism 60 is rotatably supported by the knotter head frame 56 so as to spin about the axis of the bill hook 86. The bill hook mechanism 60 rotates as one of the outer gear racks 52 engages the drive gear 84 and the knotter gear 30 is rotated. Again, rotation of the knotter shaft 28 causes rotation of the knotter gear 30.

As noted, the depicted knotter head frame 56 includes the support structure 64, which operably supports the lock mechanism 34. In particular, the support structure 64 preferably includes bosses 88,90 that present openings 88,90 to slidably support the lock mechanism 34, as described below (see FIGS. 4*a* and 4*b*).

Turning to FIGS. 4-7, each lock mechanism 34 preferably comprises a captive lock and is operable to removably secure the corresponding knotter head assembly 32 in the operating position (see FIG. 4). More specifically, the illustrated lock mechanism 34 is slidably supported by the knotter head frame 56 and is removably engaged with the locking structure 38 of the chassis 26 to secure the knotter head assembly 32 in the operating position (see FIG. 4). Furthermore, the lock mechanism 34 is releasable to permit rotation of the knotter head assembly 32 out of the operating position (see FIGS. 5 and 6).

The lock mechanism 34 preferably includes a locking pin 92 and a spring 94. The illustrated locking pin 92 includes a generally cylindrical body 96 and a pair of stops 98,100 (see FIGS. 4*a* and 4*b*). The depicted stops 98,100 are secured to the body 96 and spaced apart from each other. The stops 98,100 comprise elongated pin elements and present opposite stop surfaces 98*a*,100*a*, respectively (see FIGS. 4*b* and 5). In the depicted embodiment, the stop surfaces 98*a*,100*a* are curved and generally face in opposite directions.

However, it will be appreciated that the locking pin could be alternatively constructed without departing from the scope of the present invention. For instance, the locking pin could have alternative stops that have a different shape and/or are differently attached relative to the cylindrical body.

Similarly, the body of the locking pin could be alternatively shaped or constructed. For example, in various alternative embodiments, the locking pin could be formed with a handle feature to provide an alternative structure for grasping the locking pin.

Again, the stops 98,100 are preferably secured to the body 96 and are most preferably fixed thereto by various methods within the ambit of the present invention. For instance, the stops 98,100 could be fixed to the body 96 by adhering or welding the stops 98,100 thereto. The stops can also be secured to the body by other methods, e.g., by providing a friction fit therebetween. In alternative embodiments, the stops could also be removably secured relative to the body (e.g., with fasteners).

Again, the knotter head frame 56 includes bosses 88,90 that at least partly slidably receive the locking pin 92. The illustrated stops 98,100 are preferably located on opposite sides of the boss 88 to restrict removal of the locking pin 92 from the knotter head frame 56.

Each stop surface 98*a*,100*a* is configured to prevent sliding movement of the locking pin 92 in the corresponding direction. Thus, the surfaces 98*a*,100*a* cooperatively restrict removal of the locking pin 92 from the knotter head frame 56.

Again, it is within the ambit of the present invention for the locking pin to be alternatively configured to provide different stop surfaces (e.g., for retaining the locking pin 92 on the knotter head frame 56).

The locking pin 92 is slidably mounted on the knotter head frame 56 and slidable into and out of a locked position, in which the locking pin 92 engages the chassis 26 in the operating position. In particular, the end of the locking pin 92 is slidably received by the opening 44 in the plate 42. This releasable engagement between the locking pin 92 and the plate 42 preferably restricts rotation of the knotter head assembly 32 out of the operating position (see FIGS. 4 and 4*a*).

The locking pin 92 is also slidable into and out of an unlocked position where the lock mechanism 34 is disengaged from the chassis 26. Specifically, the locking pin 92 is slidably removed from the opening 44 so that the locking pin 92 and the plate 42 are disengaged. In the unlocked position, the lock mechanism 34 permits rotation of the knotter head assembly 32 into and out of the operating position (see FIG. 5).

The spring 94 is preferably positioned between and operably engages the boss 88 and the stop 100 to yieldably urge the locking pin 92 into the locked position. Thus, the spring 94 is operably engaged with the locking pin 92 to urge the locking pin 92 into the locked position.

However, the locking pin 92 could be alternatively engaged by a spring and thereby urged into the locked position. In various alternative embodiments, the spring could have an alternative construction and/or position for use as part of the lock mechanism. It will also be understood that the lock mechanism could use more than one spring. On the other hand, for some aspects of the present invention, the lock mechanism could be devoid of a spring.

The user can shift the knotter head assembly 32 out of the operating position to facilitate access to the knotter head assembly 32, the corresponding knotter gear 30, or various other adjacent components (e.g., for baler setup, maintenance and/or repair purposes). To move the knotter head assembly 32 out of the operating position, the user preferably shifts the lock mechanism 34 into the unlocked position. Once the lock mechanism 34 is unlocked, the user can selectively rotate the knotter head assembly 32 upwardly from the operating position (see FIGS. 5 and 6).

The depicted lock mechanism 34 can be manually held in the unlocked position by overcoming the force applied to the locking pin 92 by the spring 94. However, in alternatively embodiments, the lock mechanism could be provided with a catch element or mechanism to restrict the spring from moving the locking pin and to thereby releasably hold the locking pin in the unlocked position.

The user can selectively return the knotter head assembly 32 to the operating position. If the lock mechanism 34 is held in the unlocked position (manually or otherwise), the user can selectively rotate the knotter head assembly 32 downwardly to the operating position. The user can then release the locking pin 92 so that the spring 94 urges the locking pin 92 to return to the locked position, where the locking pin 92 engages the plate 42.

Figure 6:
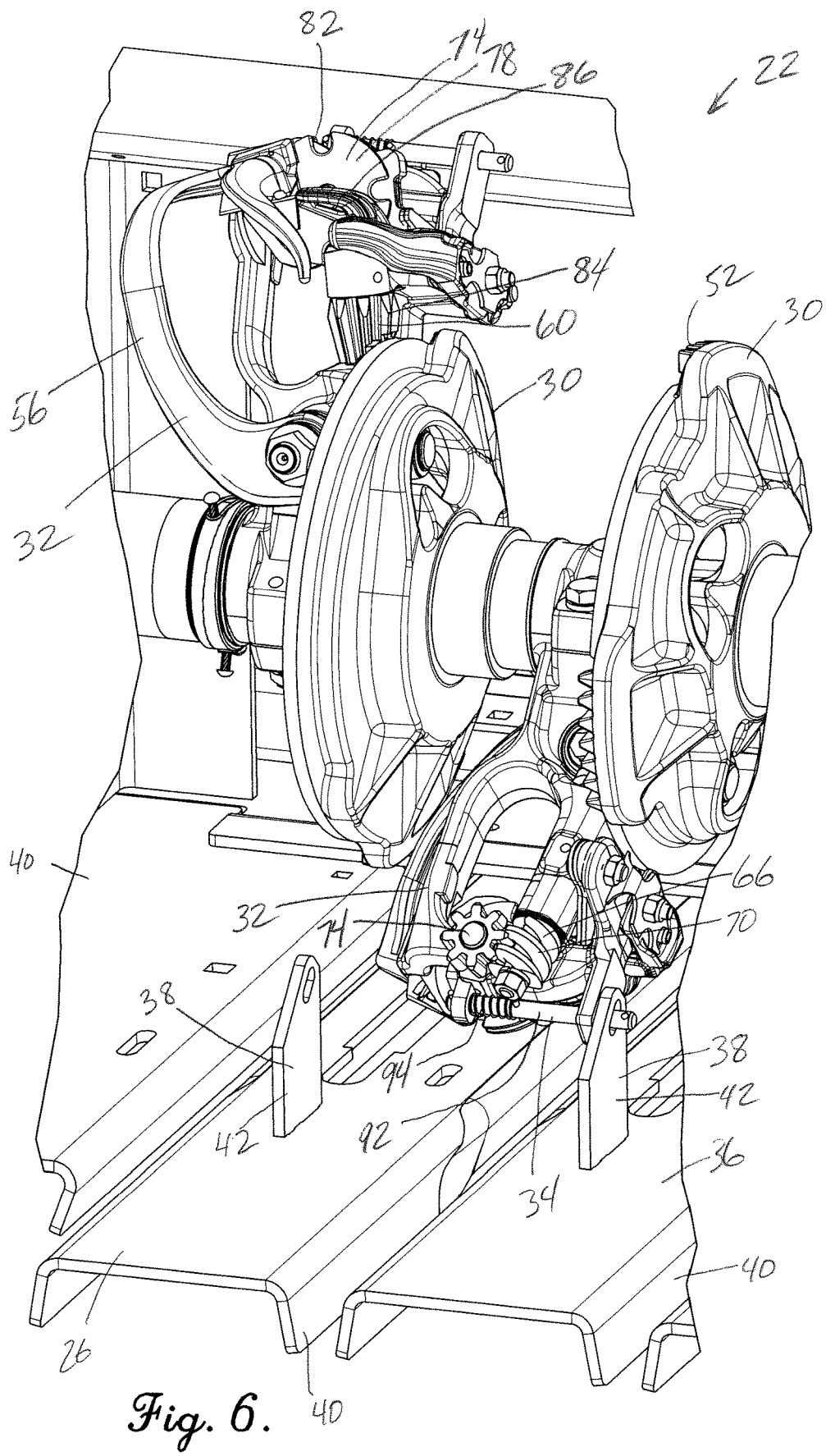
FIG. 6 is a fragmentary perspective of the agricultural baler similar to FIG. 4, but showing the captive lock released and the knotter head assembly swung upwardly out of the operating position.

When the depicted knotter head assembly 32 is shifted out of the operating position, it will be appreciated that the spring 94 may be permitted to urge the locking pin 92 from the unlocked position to the locked position (see FIG. 6). In this instance, the knotter head assembly can be returned to the operating position by again moving the locking pin 92 to the unlocked position. The user can then release the locking pin 92 so that the spring 94 urges the locking pin 92 to return to the locked position.

The depicted lock mechanism 34 is preferably a captive lock such that the lock mechanism 34 is generally not removable (i.e., separable) from the bale binding mechanism 22. However, for some aspects of the present invention, at least part of lock mechanism 34 could be removable. For instance, the lock mechanism could include a fastener (not shown), such as a pin or a threaded fastener, removably inserted through an opening 102 in the cylindrical body 96. For instance, the fastener could be secured through the opening 102 in the locked position to restrict inadvertent movement of the lock mechanism out of the locked position.

It is also within the scope of the present invention where the lock mechanism is alternatively shiftably supported relative to the knotter head frame. For instance, the locking pin could be operably mounted to slide linearly along a vertical direction into and out of the locked position. Also, in various alternative embodiments, the lock mechanism could have a locking structure that is rotatably supported relative to the knotter head frame instead of being linearly slidably supported.

The principles of the present invention are equally applicable where the lock mechanism is operably supported by the chassis instead of the knotter head frame. For instance, the locking pin could be slidably supported by the chassis and slidable into and out of engagement with one or both of the bosses provided by the knotter head frame. Again, the lock mechanism preferably comprises a captive lock, although it is within the ambit of the present invention where at least part of the lock mechanism is removable from the knotter head frame.

In operation, the knotter head assembly 32 can be moved out of the operating position to provide greater access to the knotter head assembly 32, the corresponding knotter gear 30, or other nearby components for various purposes, such as baler setup, maintenance, and/or repair. The user moves the knotter head assembly 32 out of the operating position by shifting the lock mechanism 34 into the unlocked position. Once the lock mechanism 34 is unlocked, the user can selectively rotate the knotter head assembly 32 upwardly from the operating position (see FIGS. 5 and 6).

Once the user has completed any necessary work to the knotter head assembly 32 or other components, the user can selectively rotate the knotter head assembly 32 back into the operating position while maintaining the lock mechanism 34 in the unlocked position. Once returned to the operating position, the user can lock the knotter head assembly 32 in place by releasing the locking pin 92 so that the spring 94 urges the locking pin 92 to return to the locked position.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A bale binding mechanism configured to secure a strand of binding material around a bale of severed crop material, said bale binding mechanism comprising:
    a chassis;
    a knotter head assembly operable to form at least one knot in the strand of binding material,
    said knotter head assembly including a knotter head frame swingably mounted relative to the chassis and rotatable into and out of an operating position where the knotter head assembly can form the at least one knot, said knotter head frame carrying a twine disc mechanism and a bill hook mechanism; and
    a captive lock shiftably supported by one of the chassis and the knotter head frame,
    wherein said captive lock removably engages with the other one of the chassis and the knotter head frame to secure the knotter head assembly in the operating position, and wherein the captive lock is releasable from the chassis to permit rotation of the knotter head assembly about a knotter shaft out of the operating position while the captive lock still engages with the knotter head frame.

2. The bale binding mechanism as claimed in claim 1, said captive lock slidably supported on the knotter head frame and removably engaged with the chassis.

3. The bale binding mechanism as claimed in claim 2, said captive lock including a locking pin slidably mounted on the knotter head frame and slidable into and out of a locked position where the locking pin engages the chassis in the operating position and restricts rotation of the knotter head assembly out of the operating position.

4. The bale binding mechanism as claimed in claim 3, said locking pin presenting a pair of opposite surfaces that face in opposite directions,
    each of said surfaces configured to prevent sliding movement of the locking pin in the corresponding direction, with the surfaces cooperatively restricting removal of the locking pin from the knotter head frame.

5. The bale binding mechanism as claimed in claim 4, said locking pin including a pair of stops that present the opposite surfaces, respectively.

6. The bale binding mechanism as claimed in claim 5, said knotter head frame including a boss that at least partly slidably receives the locking pin,
    said stops being located on opposite sides of the boss to restrict removal of the locking pin from the knotter head frame.

7. The bale binding mechanism as claimed in claim 6, said captive lock including a spring,
    said spring being positioned between and operably engaging the boss and one of the stops to urge the locking pin into the locked position.

8. The bale binding mechanism as claimed in claim 3, said captive lock including a spring operably engaged with the locking pin to urge the locking pin into the locked position.

9. The bale binding mechanism as claimed in claim 3, said chassis including a locking structure that presents an opening to receive the locking pin in the operating position.

10. The bale binding mechanism as claimed in claim 1, said one of the chassis and the knotter head frame providing a support structure to support the captive lock, and said other one of the chassis and the knotter head frame providing a locking structure,
    said captive lock including a locking pin slidably mounted on the support structure and slidable into and out of a locked position where the locking pin engages the locking structure in the operating position and restricts rotation of the knotter head assembly out of the operating position.

11. The bale binding mechanism as claimed in claim 10, said locking pin presenting a pair of opposite surfaces that face in opposite directions,
    each of said surfaces configured to prevent sliding movement of the locking pin in the corresponding direction, with the surfaces cooperatively restricting removal of the locking pin from the support structure.

12. The bale binding mechanism as claimed in claim 11, said locking pin including a pair of stops that present the opposite surfaces, respectively.

13. The bale binding mechanism as claimed in claim 10, said captive lock including a spring operably engaged with the locking pin to urge the locking pin into the locked position.

14. The bale binding mechanism as claimed in claim 10, said locking structure presenting an opening to receive the locking pin in the operating position.

15. The bale binding mechanism as claimed in claim 1, wherein the knotter shaft rotatably supports the knotter head frame.

16. The bale binding mechanism as claimed in claim 15, further comprising:
    a knotter gear drivingly mounted on the knotter shaft,
    said knotter gear being rotatable with the knotter shaft and relative to the knotter head frame.

17. The bale binding mechanism as claimed in claim 15, said chassis including a baler frame that supports the knotter shaft and defines a longitudinal baling chamber, with the baler frame configured to receive the bale in the baling chamber as the strand of binding material is secured around the bale.

18. The bale binding mechanism as claimed in claim 17, said knotter shaft and said knotter head assembly supported on the baler frame and positioned above the baling chamber.

\* \* \* \* \*